June 14, 1938.   C. G. KRONMILLER   2,120,938
THERMOSTAT
Filed Nov. 19, 1934    2 Sheets-Sheet 1

Inventor
Carl G. Kronmiller
By George H. Fisher
Attorney

June 14, 1938.    C. G. KRONMILLER    2,120,938
THERMOSTAT
Filed Nov. 19, 1934    2 Sheets—Sheet 2

Inventor
Carl G. Kronmiller
By George H. Fisher
Attorney

Patented June 14, 1938

2,120,938

UNITED STATES PATENT OFFICE 2,120,938

THERMOSTAT

Carl G. Kronmiller, Minneapolis, Minn., assignor to Minneapolis-Honeywell Regulator Company, Minneapolis, Minn., a corporation of Delaware Application November 19, 1934, Serial No. 753,589

14 Claims. (Cl. 200—83)

This invention relates to thermostats and particularly to thermostats utilizing a volatile fluid thermal responsive element for operating a novel switching mechanism.

Due to present day transportation requirements, it is necessary to maintain even temperature conditions in moving vehicles such as airplanes, railway cars and busses. Thermostats including temperature responsive fluid actuated elements for operating switching mechanisms have been installed in such vehicles to control the temperature conditions therein but they have not proved satisfactory due to the operation of such vehicles through various altitudes with consequent changes in barometric pressure acting on the thermostats to render their calibrations inaccurate and also due to severe jolting, jarring and vibrating of the thermostats caused by the motion of the vehicles which renders the switching action thereof unreliable by causing vibrations to be set up in the movable contact arms of the switching mechanisms.

Therefore, the prime object of this invention is to provide a thermostat comprising a temperature responsive fluid actuated element for operating a switching mechanism according to changes in temperature which is suitable for regulating the temperature of moving vehicles and which is not effected by changes in barometric pressure or by jolting and jarring of the vehicle.

Thermostats of this general character, using temperature responsive fluid actuated elements, are very accurate and maintain their initial calibration as long as they are subjected to the same atmospheric or barometric pressure condition as when they are initially calibrated. However, a thermostat of this general character, when calibrated at sea level, would not be accurate when used at high altitudes and vice versa. Further, local changes in barometric pressure caused by changing weather conditions also have some effect on the calibration of a thermostat of this type to render it inaccurate. Since a thermostat of this general type may be used in places having different barometric pressure than that where the instrument is calibrated and since the instrument may be subjected to varying barometric pressure by reason of its use in moving vehicles or by reason of changing barometric conditions caused by changing weather conditions, it is also contemplated to provide a thermostat of general utility which is not subject to these changes in barometric pressure.

Consequently, it is an object of this invention to provide a temperature responsive fluid pressure-operated device or a pressure responsive device, generally, that is not rendered inaccurate by changes in atmospheric or barometric pressure acting thereon.

More specifically, an object of this invention is to provide a volatile fluid thermostat or pressure responsive device embodying a double bellows construction whereby the effect of changes in atmospheric or barometric pressure acting thereon is reduced to a practical minimum.

Another object of this invention is to provide a thermostat or pressure responsive device that may be adjusted to and locked in an "off position" whereby changes in temperature or pressure acting thereon will not operate the thermostat or pressure responsive device.

A further object is to provide a novel adjusting and indicating means in a thermostat of the class described.

A still further object is to provide a novel adjusting and indicating means in combination with a locking means whereby a thermostat or pressure responsive device may be adjusted or locked in an "off position" by a single control means.

Another object is to provide a switching mechanism that is positively moved from one position to another by a novel snap action means whereby jarring and jolting of the switching mechanism will not affect the operation of the switching mechanism.

A further object is to provide a snap action switching mechanism with means to insure movement of the switch arm in case the switch arm should be stuck or held in one of its shifted positions by failure of the snap action means.

Other objects and advantages will become apparent to those skilled in the art by reference to the accompanying description and drawings in which.

Figure 3:
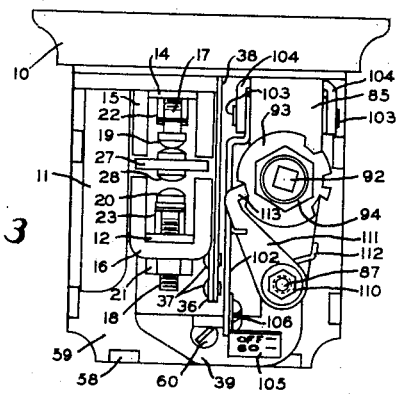
Fig. 3 is a top plan view with the cover removed.

Figs. 6, 7, 8, and 9 are plan views of a portion of the adjusting mechanism showing the parts located in different positions of adjustment.

10 designates a base made of insulating material such as "Bakelite" to which the various parts are secured and by which the instrument may be secured to a wall or like structure. A support of insulating material is shown at 11 and supports a plate 12. The plate 12 and support 11 are secured to the base 10 by means of screws 13 which screws also act as electrical conducting means from the plate 12 to suitable binding posts located on the back of the base 10. 14 designates another plate similar to the plate 12 but spaced rearwardly therefrom. The plates 12 and 14 support, respectively, magnets 16 and 15. The plate 14 and magnet 15 are secured to the base 10 by means of a screw 17 and the magnet 16 is secured to the plate 12 by means of a screw 18 cooperating with a nut 21. The screws 17 and 18 have abutments 19 and 20 respectively located at the inner ends thereof. Screw 17 affords an electrical connection between the plate 14 and a suitable binding post located on the back of the base 10.

Secured to the plates 14 and 12 by means of rivets 24 are spring arms 22 and 23 respectively. These spring arms 22 and 23 have contacts 25 and 26 and upwardly extending portions to engage the abutments 19 and 20 to limit the inward movement thereof. Located between spring arms 22 and 23 is a conducting spring switch arm 27, having abutments 28 engageable alternately with the abutments 19 and 20 and contacts 29 engageable alternately with the contacts 25 and 26 of the spring arms 22 and 23. Abutment levers 30 and 31 are provided in spaced relation on either side of the spring switch arm 27, the abutment levers 30 and 31 and the spring switch arm 27 being secured to an actuator block 33, made of insulating material, by means of screws 32. An electrical connection is made between the flexible switch arm 27 and a binding post 35 by means of a flexible lead wire 34 being connected to one screw 32 and the binding post 35.

The forward plate 12 has a forwardly extending flange 36 to which is riveted an insulating shield 38 by means of rivets 37.

39 designates a knife edge supporting member secured to the base 10 by means of screws 40 and having downwardly extending knife edges 41. A lever 43 is provided with concavo-convex portions 42 to be engaged by the knife edges 41 and an upwardly extending flange 44 to which the actuator block 33 is secured by means of screws 45. On the lower side of the lever 43 there is suitably secured an abutment 47 adapted to receive a knife edge 48 which is held in place by a bolt head 49 of an upwardly extending bolt 50. The bolt 50 is screw-threaded into a grooved nut 51 which is secured to the lower end of a tension spring 52 and the upper end of the tension spring 52 is secured to a temperature adjusting means generally indicated at 53.

Also, on the lower side of the lever 43 is a concave portion 54 adapted to receive a plunger point 55 of a temperature responsive means generally designated at 56. The forward portion of the supporting member 39 is provided with a slot 46 through which the lever 43 extends to provide stops to limit the movement of the lever 43.

Figure 1:
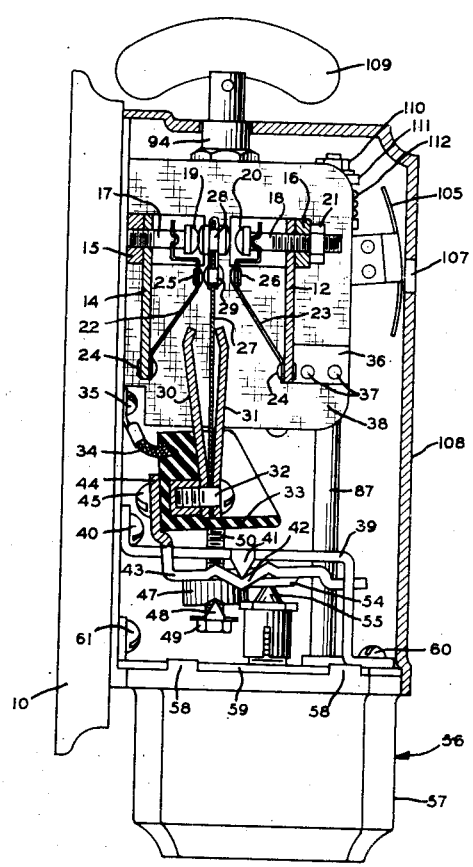
Fig. 1 is a vertical side elevational view of the thermostat looking from the left in Fig. 2, but showing the cover and the electric switch mechanism in section.
Figure 2:
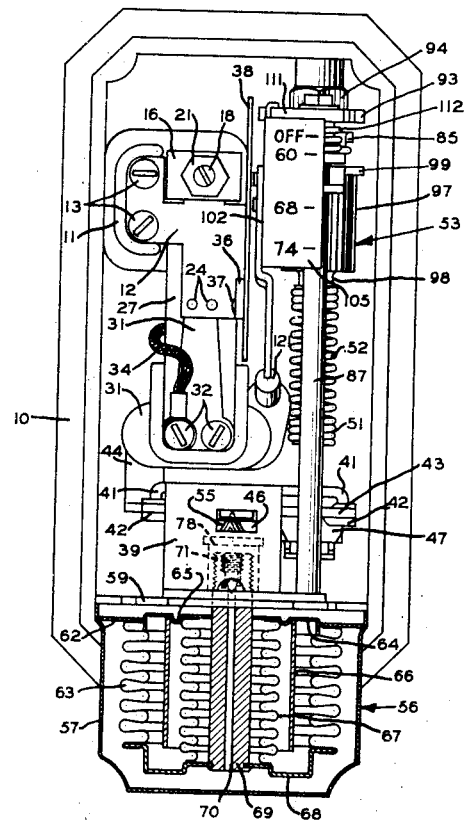
Fig. 2 is a front elevational view with the corner removed and the temperature responsive means shown in section.

From the above, it will be seen that the tension spring 52 urges the lever 43 in a clockwise direction against the bottom of the slot 46 and that the temperature responsive means 56 urges the lever 43 in a counter-clockwise direction against the top of the slot 46 as viewed in Fig. 1. Assuming that the temperature acting upon the temperature responsive means is relatively high, the lever 43 is maintained in a counter-clockwise direction against the tension of the spring 52 as seen in Fig. 1 to urge the movable contact 29 of the switch arm 27 against the contact 25 and the movable abutment 28 against the abutment 19 to complete an electric circuit from the screw 17, through plate 14, spring arm 22, contact 25, contact 29, switch arm 27, screws 32 and lead wire 34 to binding post 35. Current is also carried from screw 17 to switch arm 27 through the abutments 19 and 28.

When the temperature decreases, the tension spring 52 overcomes the force of the temperature responsive means 56 and moves the lever 43 in a clockwise direction from that position shown in Fig. 1 to move the contact 29 away from the contact 25 and the abutment 28 away from the abutment 19. However, the switch arm 27 is located in the magnetic field of the magnet 15 and this movement is retarded until sufficient spring force has been built up in the spring switch arm 27 to overcome this magnetic holding effect of the magnet 15. When this magnetic effect is so overcome, the tension in the switch arm 27 caused by clockwise movement of lever 43 will snap the contact 29 and the abutment 28 into engagement with the contact 26 and the abutment 20 completing a circuit from the screws 13 through plate 12, spring arm 23, contact 26, contact 29, switch arm 27, screw 32, and wire 34 to binding post 35. Here again, current is conducted from plate 12 to the switch arm 27 by means of the screw 18 and abutments 20 and 28. Due to the fact that the switch arm 27 is magnetically held in one position until sufficient force has been built up to move it to another position, jolting and jarring of the thermostat will not cause the switch arm to vibrate between its contacts.

If, for any reason, the contact 29 should become stuck to the contact 25 or the abutment 28 become stuck to the contact 19 or the magnetic fields of the magnets 15 and 16 be too powerful so as to prevent the above normal movement of the contact 29 and the abutment 28 to the right, further movement of the lever 43 in the clockwise direction will cause abutment arm 30 to engage switch arm 27 to positively move contact 29 into engagement with contact 26 and the abutment 28 into contact with the abutment 20. This insures positive movement of the switch arm 27 to make and break the contacts.

Upon an increase in temperature, the temperature responsive means 56 will overcome the tension in the spring 52 to move the contact 29 into engagement with the contact 25 and the abutment 28 into engagement with the contact 19 in the exact reverse manner as pointed out above and a complete description of this reverse operation is therefore not considered necessary.

A vital feature of this invention is the provision of a novel temperature responsive means 56 which is not affected by changes in barometric pressure and which comprises a volatile fluid containing chamber 57 which is secured by means of bent over flanges 58 to a plate 59 which is secured by means of a screw 60 to the forward end of the knife edge supporting member and by means of screws 61 to the base 10. Soldered to the inside of the chamber 57 adjacent the top thereof is an annular plate 62 and soldered to the underside of this annular plate 62 is the upper end of a bellows 63. Soldered to the inner periphery of the annular plate 62 is another annular plate 64, having a downwardly extending annular shoulder 65 to which is soldered a tubular guide and stop member 66. At the inner portion of the plate 64 is soldered the upper end of a bellows 67 of much smaller diameter than the bellows 63. Soldered to the lower ends of the bellows 63 and 67 is a movable plate 68 which is riveted and soldered to a vertical plunger 69. The spaces enclosed by the casing 57 and the bellows 63 and by the bellows 63 and 67 are, therefore, hermetically sealed. The vertical plunger 69 has a longitudinally extending bore 70 which is normally closed by means of a screw-threaded plug 71. Secured over the upper end of the plunger 69 so as to enclose the plug 71 is a cap 78 which has formed integral therewith the plunger point 55.

By removing the plug 71, a charge of volatile fluid may be inserted through the bore 70 into a chamber formed by the volatile fluid containing chamber 57, the annular plate 62, the bellows 63 and the movable plate 68. After the required amount of volatile fluid has been inserted in this chamber, the chamber is hermetically sealed by inserting the plug 71 to close the passage 70. An increase in temperature of the air surrounding the volatile fluid containing chamber 57 causes the fluid contained therein to expand and act against the movable plate 68 to move the plunger 69 upwardly to actuate the switching mechanism as pointed out above.

If the bellows 67 were not present, atmospheric or barometric pressure would exert a downward force on the upper side of the movable plate 68 and would be effective upon the annular area between the bellows 63 and the plunger 69. This area is substantially the same as the area affected by the volatile fluid and changes in barometric pressure would counteract the action of the volatile fluid contained in the chamber 57. An increase in barometric pressure would retard the movement of the plate 68 by the expansion of the volatile fluid and destroy the calibration of the thermostat while a decrease in barometric pressure would hasten the action of the volatile fluid also to render the calibration of the thermostat inaccurate.

By inserting the relatively small bellows 67 in the device as above described, changes in barometric pressure will affect the movable plate 68 only on the annular area defined by the bellows 67 and the the plunger 69 since the space between the bellows 63 and 67 is hermetically sealed from the atmosphere. This area is extremely small as compared to the area subject to the pressure of the volatile fluid whereby any changes in barometric pressure acting upon this extremely small annular area will be practically negligible and will not affect the calibration or operation of the thermostat.

Figures 4, 5:
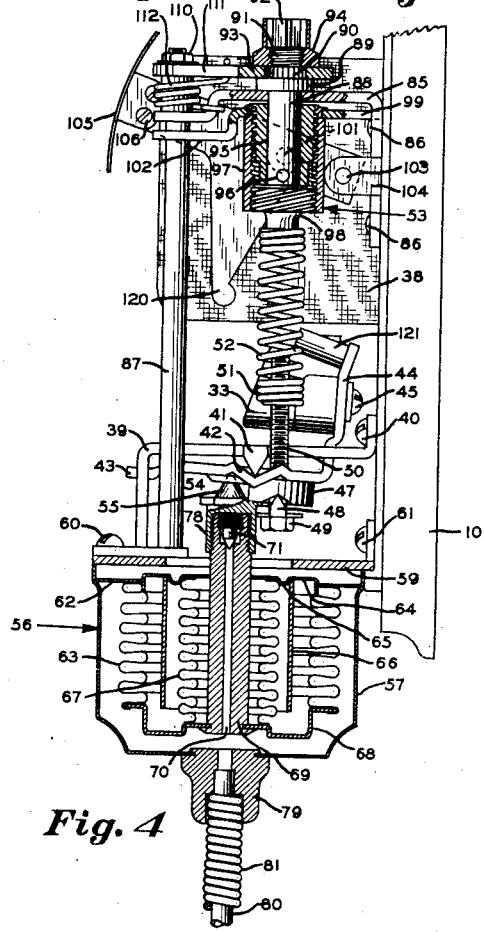
Fig. 4 is a side elevational view looking from the right in Fig. 2 with the cover removed and showing the temperature adjusting means and a modification of the temperature responsive means in section.
Fig. 5 is a side elevational view looking from the right in Fig. 2.

In Fig. 4 I have illustrated a modified form of temperature responsive device wherein I use a remote control system. The bellows structure is the same as described above but the volatile fluid containing chamber 57 has an opening made in the bottom thereof and a plug 79 is riveted and soldered in this opening. The plug 79 is adapted to receive in a gas-tight manner a capillary tube 80 which is secured to a remote control bulb 82 and the plug 79 is also adapted to receive a protective covering 81 for the capillary tube 80.

The operation of this modification is the same as the one pointed out above except that the volatile fluid is volatilized in the bulb 82 and the pressure is transmitted therefrom to the chamber 57 by means of the capillary tube 80.

Although I have disclosed a volatile fluid temperature responsive device, it is within the concept of this invention to include a pressure-actuated device wherein changes in pressure from some pressure device may be transmitted into the casing 57 by means of suitable connections.

The means 53 for adjusting the spring 52 to determine at which temperature the thermostat will become operative is supported by means of a support 85 which is secured to the base 10 by means of screws 86. This support 85 extends forwardly and supports the upper end of a column 87 which is secured at its lower end into the knife edge supporting member 39. As seen in Fig. 4, mounted in an opening in the support 85 is a shaft 88, having a shoulder 89 in abutting relation with the support 85, a corrugated portion 90, a screw-threaded portion 91 and a squared portion 92. Mounted against rotation on the corrugated portion 90 of the shaft 88 is a cam 93 which is held in place by means of a nut 94 screw-threaded on the screw-threaded portion 91 of the shaft 88. Secured to the shaft beneath the support 85 by means of a pin 96 is a helix screw 95 which cooperates with a helix nut 97. Secured in the bottom of the helix nut 97 is a plug 98 to which is attached the upper end of the spring 52. The helix nut 97 is rigidly secured to a member 99 which is slideably mounted in a vertical direction on the column 87 and in a slot in the supporting member 85. By this construction, when the shaft 88 is rotated, the helix screw 95 will rotate therewith by reason of the pin 96 and since the helix nut 97 is held against rotation helix nut 97 will move in an up and down direction carrying with it the slideable member 99 and at the same time adjusting the tension in the spring 52.

The slideable member 99 has a downwardly extending flange 100 in which is secured a pin 101. Located adjacent this downwardly extending flange 100 is an arm 102 which extends rearwardly and is pivoted to forwardly extending flanges 104 of the supporting member 85 by means of a pin 103. The pin 101 of the downwardly extending flange 100 engages in a hole in the arm 102 so that upward and downward movement of the slideable member 99 causes oscillating movement of the arm 102 about its pivot 103. A graduated dial 105 is secured to the forward end of the arm 102 by means of screws 106 and this graduated dial 105 cooperates with an opening 107 in the cover 108 to indicate indirectly the tension in the spring 52 or directly the temperature at which the thermostat will become operative to move the switch arm 27. Rotating movement to adjust the adjusting mechanism 53 is imparted to the shaft 88 by means of a key 109 engageable with the squared portion 92 of the shaft 88.

A latch arm 111 is pivotally mounted on the upper end of the column 87 and is held in place by means of a nut 110. This latch arm 111 is urged in a clockwise direction as shown in Fig. 3 by means of a spring 112 which engages the latch arm 111 and the supporting member 85. On the outer end of the latch arm 111 is a projection 113 which engages at various adjustments in notches 114, 115, 116, and 117 in the cam 93. These notches are annularly spaced to correspond to the graduations of the dial 105 and in the exemplification shown, the latch projection 113 engages in the notch 114 when the graduation "74" appears in the opening 107 of the cover 106. In like manner, the notches 115, 116, and 117 correspond directly with the graduations "68", "60" and "off".

Figure 6:
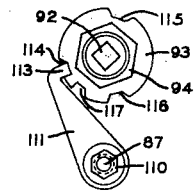
Figure 7:
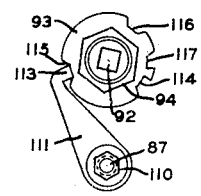
Figure 8:
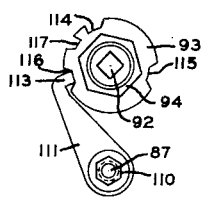
Figure 9:
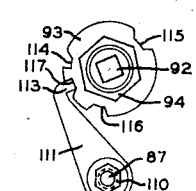

By referring to Figs. 6, 7, 8, and 9, it is seen that notches 115 and 116 have tapered sides and that notches 114 have their sides nearest to the notches 115 and 116 tapered and their adjacent sides not so tapered so that clockwise movement of the cam 98 as seen in Fig. 6 is prevented and counter-clockwise movement of the cam 98 as seen in Fig. 9 is prevented. Therefore, these notches 114 and 117 determine the amount of rotation of the cam 98 and consequently the range of adjustment of the adjusting means 53. The tapered sides of the notches eject the latch projection 113 therefrom upon rotation of the cam 98. Fig. 6 shows the parts in position for operation at 74°, Fig. 7 at 68°, Fig. 8 at 60° and Fig. 9 at "off".

It is obvious to anyone skilled in the art that the number of notches in the cam 98 and the number of graduations on the scale 105 may be increased or decreased at will according to the desired adjustment of the instrument.

The arm 102 extends downwardly and has an abutment 120 which engages a pin 121 located on the upwardly extending flange 44 of the lever 43. When the adjusting means 53 has so been adjusted to move it to "off" position, the abutment 120 engages pin 121 as shown in Fig. 5 which prevents counter-clockwise movement of the lever 43 as viewed in Fig. 5 so that when the temperature affecting the temperature responsive means 56 decreases, the spring 52 cannot become operative to move the switching mechanism.

A brief description of the operation of the device is as follows: Assume that the thermostat is hooked up to a heating device in such manner that when the contact 29 of the switch arm 27 engages the contact 25, the heating device will be shut off and that when the contact 29 engages the contact 26 the heating device will be turned on. With the parts in the position shown in Fig. 1, the device is adjusted to respond to a temperature of 68° and the temperature acting on the temperature responsive means 56 is greater than 68°, therefore the heating device is shut off. When the temperature falls below 68°, the tension spring 52 overcomes the temperature responsive device 56 and moves contact 29 of the switch arm 27 into engagement with contact 26 to complete a circuit to turn on the heating device to restore the temperature to 68°. Like operation will occur when the device is set for 74° and for 60°, the 74° position being shown in Fig. 4.

When the adjusting means 53 is adjusted to "off" position, the abutment 120 engages the pin 121 which prevents counter-clockwise movement of lever 39 as viewed in Fig. 5 or prevents clockwise movement of lever 43 as viewed in Fig. 1. Since this movement of the lever 39 is prevented by means of the abutment 120, the contact 29 cannot move to the right to engage the contact 26 as viewed in Fig. 1 to close the circuit for turning on the heating device. Therefore, when the thermostat is adjusted to "off" position, it cannot become operative to call for heat regardless of how low the temperature may fall.

From the above, it is seen that I have invented a novel thermostat that is not rendered inaccurate by changes in atmospheric or barometric pressure acting thereon, that may be adjusted and locked in an "off" position whereby changes in temperature acting thereon will not operate the thermostat, that moves the switch with a positive snap action, that insures the movement of the switch in case the switch should become stuck or held in any one of its shifted positions and that provides a novel means for adjusting and indicating the adjustment of the thermostat.

While the apparatus herein described constitutes a preferred embodiment of the invention, it is to be understood that the invention is not limited to the preferred apparatus and that changes may be made therein without departing from the scope of the invention which is defined in the appended claims.

I claim:

1. In a device of the character described, comprising in combination, a casing having an aperture therethrough, a movable wall in said casing, an actuating member associated with said wall and extending through said aperture into the surrounding atmosphere, a bellows surrounding said aperture and sealed to said wall whereby said casing, wall, and bellows form a pressure chamber, variations in pressure therein serving to move said wall, and a seal adjacent said aperture to preclude contact of atmospheric pressure with at least a portion of said wall.

2. In a device of the character described, comprising in combination, a casing having an aperture therethrough, a movable wall in said casing, an actuating member associated with said wall and extending through said aperture into the surrounding atmosphere, a bellows surrounding said aperture and sealed to said wall whereby said casing, wall, and bellows form a pressure chamber, variations in pressure therein serving to move said wall, and sealing means surrounding said aperture and associated with said wall to preclude contact of atmospheric pressure with at least a portion of said wall.

3. In a device of the character described, comprising in combination, a casing having an aperture therethrough, a movable wall in said casing, an actuating member associated with said wall and extending through said aperture into the surrounding atmosphere, a bellows surrounding said aperture and sealed to said wall whereby said casing, wall, and bellows form a pressure chamber, variations in pressure therein serving to move said wall, and a second bellows surrounding said aperture and sealed to said wall but positioned interiorly of said first mentioned bellows with respect to said aperture whereby to form a seal to preclude contact of atmospheric pressure with a portion of said wall.

4. In a device of the character described, comprising in combination, a casing having an aperture therethrough, a movable wall in said casing, an actuating member sealed to said wall and extending through said aperture into the surrounding atmosphere, a bellows surrounding said aperture and hence said actuating member and sealed to said wall whereby said casing, wall, and bellows form a pressure chamber, variations in pressure therein serving to move said wall and hence said actuating member, a second bellows sealed to said wall and to said casing adjacent and surrounding said aperture to form a hermetically sealed chamber co-axial with and interiorly positioned with respect to said pressure chamber whereby to preclude contact of atmospheric pressure with a portion of said wall, said second mentioned bellows being spaced from said actuating member whereby said actuating member may move in accordance with the movement of said wall in a substantially friction free manner.

5. A pressure operated switch adapted for use under varying external pressure conditions and subject to jolting and jarring comprising, a pressure actuated device having a member that is movable according to changes in pressure acting thereon, means associated with said pressure device to prevent the varying external pressure conditions from affecting the movement of said movable member, said means comprising a sealing member to preclude contact of atmospheric pressure with at least a portion of said pressure actuated device, a resilient switch arm operated by said movable member, contacts to be engaged by said resilient switch arm, magnetic means for resisting movement of said resilient switch arm until said resilient switch arm is sufficiently flexed by said movable member to completely move said resilient switch arm with a snap action whereby jolting and jarring of the switch will not cause said switch arm to vibrate.

6. In a switching mechanism of the class described, opposed abutments, opposed magnets adjacent said abutments, opposed resiliently mounted contacts adjacent said abutments, means for varying the position of at least one of said contacts and its associated abutment simultaneously, a spring switch arm between said abutments adapted to be moved from one abutment to the other and held in shifted position by said magnets until sufficient energy has been built up in said spring switch arm to insure its movement from one abutment to the other and contacts on said spring switch arm to alternately engage said opposed contacts.

7. In a switching mechanism of the class described, opposed abutments, a magnet adjacent each abutment, a resiliently mounted contact adjacent each abutment, means for varying the position of at least one of said contacts and its associated abutment simultaneously, a resilient member movable alternately between said abutments and adapted to be held against said abutments by said magnets, means for flexing said resilient member to overcome the effect of said magnets to snap said resilient member from one abutment to the other and contacts on said resilient member to engage said resiliently mounted contacts.

8. In a switching mechanism of the class described, opposed abutments, a magnet adjacent each abutment, a resiliently mounted contact adjacent each abutment, a resilient member movable alternately between said abutments and adapted to be held against said abutments by said magnets, means for flexing said resilient member to overcome the effect of said magnets to snap said resilient member from one abutment to the other, and means to move said resilient member from one abutment to the other in case said first means fails to move said resilient member.

9. In a switching mechanism of the class described, opposed abutments opposed magnets adjacent said abutments, opposed resiliently mounted contacts adjacent said abutments, a resilient member movable alternately between said abutments and adapted to be held against said abutments by said magnets, means responsive to changes in a condition for flexing said resilient member to overcome the effect of said magnets to snap the resilient member from one abutment to the other, contacts on said resilient member to engage said resiliently mounted contacts, adjusting means for determining the change in the condition required to move said resilient member from one abutment to the other and means associated with said adjusting means to lock said resilient member against one of said abutments.

10. An adjusting and indicating means for an instrument operated in response to changes in a condition comprising, a rotatable screw and nut for determining the change in the condition required to operate the instrument, a cam rotated by said screw and having notches therein, means cooperating with said notches for determining the value of adjustment and a graduated indicating dial moved by said nut to visually indicate the value of adjustment, said notches and said graduations corresponding in value with each other.

11. A combined adjusting, indicating and locking means for an instrument operated in response to a condition, means for adjusting the instrument for determining the change in the condition required to operate the instrument, means operated by said adjusting means for locking the instrument whereby the instrument cannot be operated by changes in the condition, means for indicating the value of adjustment and the locking of the instrument and detent means for maintaining said adjusting means in any one of its adjusted positions.

12. A combined adjusting, indicating and locking means for an instrument operated in response to changes in a condition comprising, a rotatable screw and nut for determining the change in the condition required to operate the instrument, a member rotated by said screw having a plurality of detents therein, means cooperating with said detents for determining the value of adjustment and limiting the range of adjustment, a graduated indicating dial moved by said nut and means operated by said nut at one limit of the range of adjustment to lock said instrument whereby said instrument cannot be operated by changes in the condition, said graduations of the dial corresponding to the detents of the member to indicate the value of the adjustment and the locking of the instrument.

13. In a device of the character described, a casing, an element to be moved, means to move said element in response to pressure changes in said casing, means associated with said element to preclude external atmospheric pressure from affecting said element, adjusting means movable through a given range of adjustment for determining the change in pressure required to move said element, and detent means associated with said adjusting means for maintaining said adjusting means in any one of a plurality of adjusted positions.

14. In a mechanism of the class described, opposed contacts, a magnet adjacent each contact, a resilient member movable alternately between said contacts and adapted to be held against said contacts by said magnets, means for flexing said resilient member to overcome the effect of said magnets to snap said resilient member from one contact to the other, and means to move said resilient member from one contact to the other in case said first means fails to move said resilient member.

CARL G. KRONMILLER.